(12) United States Patent
Dunkel et al.

(10) Patent No.: US 7,630,952 B1
(45) Date of Patent: Dec. 8, 2009

(54) METHOD FOR THE COMPUTER-ASSISTED EVALUATION OF CHARACTERISTIC VALUES OF A TECHNICAL SYSTEM

(75) Inventors: Veronika Dunkel, München (DE); Benedikte Elbel, München (DE); Michael Greiner, Dachau (DE); David Meintrup, München (DE)

(73) Assignee: Siemens Aktiengesellschaft, Munich (DE)

( * ) Notice: Subject to any disclaimer, the term of this patent is extended or adjusted under 35 U.S.C. 154(b) by 425 days.

(21) Appl. No.: 11/579,631

(22) PCT Filed: May 4, 2005

(86) PCT No.: PCT/EP2005/052036

§ 371 (c)(1),
(2), (4) Date: Nov. 6, 2006

(87) PCT Pub. No.: WO2005/109137

PCT Pub. Date: Nov. 17, 2005

(30) Foreign Application Priority Data

May 5, 2004 (DE) ........................ 10 2004 022 144

(51) Int. Cl.
*G06F 15/00* (2006.01)
(52) U.S. Cl. ............... 706/62; 706/12; 706/14; 706/45; 706/60; 702/1; 702/59; 702/108; 702/127; 717/104; 717/124; 717/157
(58) Field of Classification Search ............ 706/12, 706/14, 45–47, 60, 62; 702/1, 59, 108, 127, 702/179–186; 717/104, 124–135, 151–156
See application file for complete search history.

(56) References Cited

U.S. PATENT DOCUMENTS 5,548,718 A * 8/1996 Siegel et al. .................. 714/38

(Continued)

FOREIGN PATENT DOCUMENTS

DE 296 17 200 U1 12/1997

(Continued)

OTHER PUBLICATIONS

Calabria et al. "A Reliability-Growth Model in a Bayes-Decision Framework", IEEE Transactions on Reliability, 1996, pp. 505-510.*

(Continued)

*Primary Examiner*—David R Vincent
*Assistant Examiner*—Omar F Fernandez Rivas
(74) *Attorney, Agent, or Firm*—Staas & Halsey LLP

(57) ABSTRACT

During a total temporal interval a plurality of characteristic values of the technical system are determined. The total temporal interval is divided into a plurality of partial intervals, each partial interval being between a partial interval starting point and a partial interval end point in the total interval. According to said method, for each partial interval, at least one parameter of a pre-determined predictive model is adapted to the characteristic values determined in the partial interval in such a way as to obtain a partial adaptation with which a partial interval and the end point of the partial interval are associated. Respectively one modification measure is determined for the partial adaptations in such a way as to indicate the modifications of the parameters of the respective partial adaptation in relation to the parameters of at least one adjacent partial adaptation. The interval between the partial interval end point of a respective partial adaptation and the partial interval end point of the at least one adjacent partial adaptation is marked as an inhomogeneous interval, if the modification measure is higher than a predetermined value.

18 Claims, 4 Drawing Sheets

U.S. PATENT DOCUMENTS

| | | | |
|---|---|---|---|
| 6,064,810 A * | 5/2000 | Raad et al. ............... 703/23 |
| 6,281,465 B1 | 8/2001 | Müller et al. |
| 6,728,658 B1 * | 4/2004 | Bechhoefer ............ 702/181 |
| 6,917,839 B2 * | 7/2005 | Bickford ............... 700/30 |
| 7,136,794 B1 * | 11/2006 | Bechhoefer ............. 703/7 |
| 2002/0082796 A1 | 6/2002 | Fang et al. |
| 2002/0183965 A1 * | 12/2002 | Gogolak ............... 702/179 |
| 2003/0065482 A1 * | 4/2003 | Bechhoefer ............ 702/183 |
| 2003/0115017 A1 * | 6/2003 | Sun et al. ............ 702/181 |
| 2003/0154044 A1 * | 8/2003 | Lundstedt et al. ...... 702/104 |
| 2004/0006398 A1 * | 1/2004 | Bickford ............... 700/30 |
| 2004/0019838 A1 | 1/2004 | Marr |
| 2005/0021293 A1 | 1/2005 | Elbel et al. |

FOREIGN PATENT DOCUMENTS

| | | |
|---|---|---|
| DE | 102 41 746 A1 | 3/2004 |
| WO | WO 03/065138 A1 | 8/2003 |

OTHER PUBLICATIONS

Crow, Larry; "An Extended Reliability Growth Model for Managing and Assessing Corrective Actions", IEEE, 2004, pp. 73-80.*

Hong et al. "A Practical Method for the Estimation of Software Reliability Growth in the Early Stage of Testing", IEEE, 1997, pp. 116-123.*

Huang et al. "Analysis of a Software Reliability Growth Model with Logistic Testing-Effort Function", IEEE, pp. 378-388.*

Kapur et al. "A Software Reliability Growth Model for an Error-Removal Phenomenon" Software Engineering Journal, 1992, pp. 291-294.*

Yamada et al. "Software-Reliability Growth with a Weibull Test-Effort: A Model and Application", IEEE Transactions on Reliability, 1993, pp. 100-106.*

Zeephongeskul et al. "Software-Reliability Growth Model: Primary-Failures Generate Secondary-Faults Under Imperfect Debugging", IEEE Transactions on Reliability, 1994, pp. 408-413.*

Chenggang Bai et al.: "An efficient defect estimation method for software defect curves", Proceedings of the 27th annual International Computer Software and Application Conference, COMPSAC 2003, Dalls, TX, Nov. 3-6, 2003.

Lawrence, Denis: "Software Reliability and Safety in Nuclear Reactor Protection Systems", US Nuclear Regulatory Commission, 1993, pp. 101 to 105.

* cited by examiner

METHOD FOR THE COMPUTER-ASSISTED EVALUATION OF CHARACTERISTIC VALUES OF A TECHNICAL SYSTEM

CROSS REFERENCE TO RELATED APPLICATIONS

This application is based on and hereby claims priority to International Application No. PCT/EP2005/052036 filed on May 4, 2005, and German Patent Application No. 10 2004 022 144.8 filed on May 5, 2004, the contents of which are hereby incorporated by reference.

BACKGROUND

The invention relates to a method for computer-assisted evaluation of characteristic values of a technical system, a corresponding arrangement and a corresponding computer program product.

Reliability growth models are known, said models allowing the failure response of a technical system to be analyzed during the course of a test and correction process and the reliability of the technical system to be predicted. For example, Lawrence, Denis: "Software Reliability and Safety in Nuclear Reactor Protection Systems", US Nuclear Regulatory Commission, 1993, pages 101-105, describes models whereby the increase in the reliability of a program can be determined in a test time window.

The known predictive models are based on the assumption that the test and correction process of the technical system does not change over time, but this is not always the case. In particular, inhomogeneities in the test and correction process can occur, e.g. due to a change in the test method or a change in the personnel performing the tests, particularly if the new personnel does not have the same test experience as the previous personnel. In such cases the characteristic values of the observed technical system are no longer correctly evaluated by predictive models and it is therefore desirable to localize inhomogeneities in the test process.

SUMMARY

One possible object is therefore to create a method for the computer-assisted evaluation of characteristic values of a technical system, wherein inhomogeneities can be determined when the characteristic values are specified.

The inventors propose a method in which a total temporal interval having a start point and an end point during which a plurality of characteristic values of the technical system have been determined is divided into a plurality of partial intervals, wherein each partial interval occurs between a partial interval start point and a partial interval end point within the total interval. For each partial interval, one or more parameters of a predetermined predictive model are adapted to the characteristic values which are determined in the partial interval, thereby providing a partial adaptation which is assigned a partial interval and the partial interval end point of the partial interval. A modification measure is then determined for each of the partial adaptations, specifying the modification of the parameters of the relevant partial adaptation in relation to the parameters of at least one adjacent partial adaptation, wherein the at least one adjacent partial adaptation is assigned a partial interval whose partial interval end point is adjacent to the partial interval end point of the partial interval concerned. The interval between the partial interval end point of a respective partial adaptation and the partial interval end point of the at least one adjacent partial adaptation is flagged as an inhomogeneous interval if the modification measure is greater than its predefined value.

By analyzing the parameter modification of the partial adaptations of the predictive model, it is possible to establish the time window in which a particularly large parameter modification occurred within the total interval. Such a parameter modification indicates that an inhomogeneity occurred when determining the characteristic value in said time window. As a result of flagging the corresponding time window, the inhomogeneous intervals can be analyzed again in greater detail after the method is finished in order to identify the cause of these inhomogeneities.

In a preferred embodiment of the method, the modification measure for the respective partial adaptation is dependent on the maximum selected from the modification of the parameters of the relevant partial adaptation in relation to the parameters of the adjacent partial adaptation having an adjacent smaller partial interval end point and the modification of the parameters of the relevant partial adaptation in relation to the parameters of the adjacent partial adaptation having an adjacent greater partial interval end point. In this case the total interval between the adjacent smaller partial interval end point and the adjacent greater partial interval end point is flagged as an inhomogeneous interval if the modification measure is greater than a predefined value.

In a particularly preferred embodiment, the modification measure specifies the amount of the relative modification of the parameters of the respective partial adaptation in relation to parameters of at least one adjacent partial adaptation.

In a preferred embodiment, the partial intervals are nested within each other, i.e. each partial interval begins at the start point of the total interval, such that partial intervals having greater partial interval end points also always include partial intervals having smaller partial interval end points.

The adaptation of the predetermined predictive model to the characteristic values which are determined in the respective partial interval is preferably determined in accordance with the maximum likelihood method and/or the least squares method. These methods are sufficiently well known from statistical mathematics.

In a particularly preferred embodiment, the predetermined predictive model is a reliability prediction model and the characteristic values of the technical system are values which represent the reliability of the technical system. In particular, the characteristic values here can be the amount of total failures of the technical system at the instant of determining the characteristic value and/or the average time before the occurrence of a failure of the technical system at the instant of determining the characteristic value.

In a further particularly preferred embodiment, the technical system has a processor on which a program is executed, wherein the predetermined predictive model is a reliability growth model for the program. Reliability growth models are known and assume in particular that no inhomogeneities occur within the total interval concerned. When using reliability growth models, therefore, it is very important to determine such inhomogeneities using the method.

In a further embodiment, the total temporal interval is in particular a test and correction phase of the technical system, wherein the technical system was continuously adapted during this phase in order to improve its reliability.

In addition to the above-described method, an arrangement for the computer-assisted evaluation of characteristic values of a technical system is disclosed, wherein the arrangement is embodied such that the method can be performed using this arrangement.

In addition, a computer program product is disclosed which can be loaded into the memory of a computer and comprises software code sections by which the method is performed when the program product runs on the computer.

BRIEF DESCRIPTION OF THE DRAWINGS

These and other objects and advantages will become more apparent and more readily appreciated from the following description of the preferred embodiments, taken in conjunction with the accompanying drawings of which.

DETAILED DESCRIPTION OF THE PREFERRED EMBODIMENT

Figure 1:
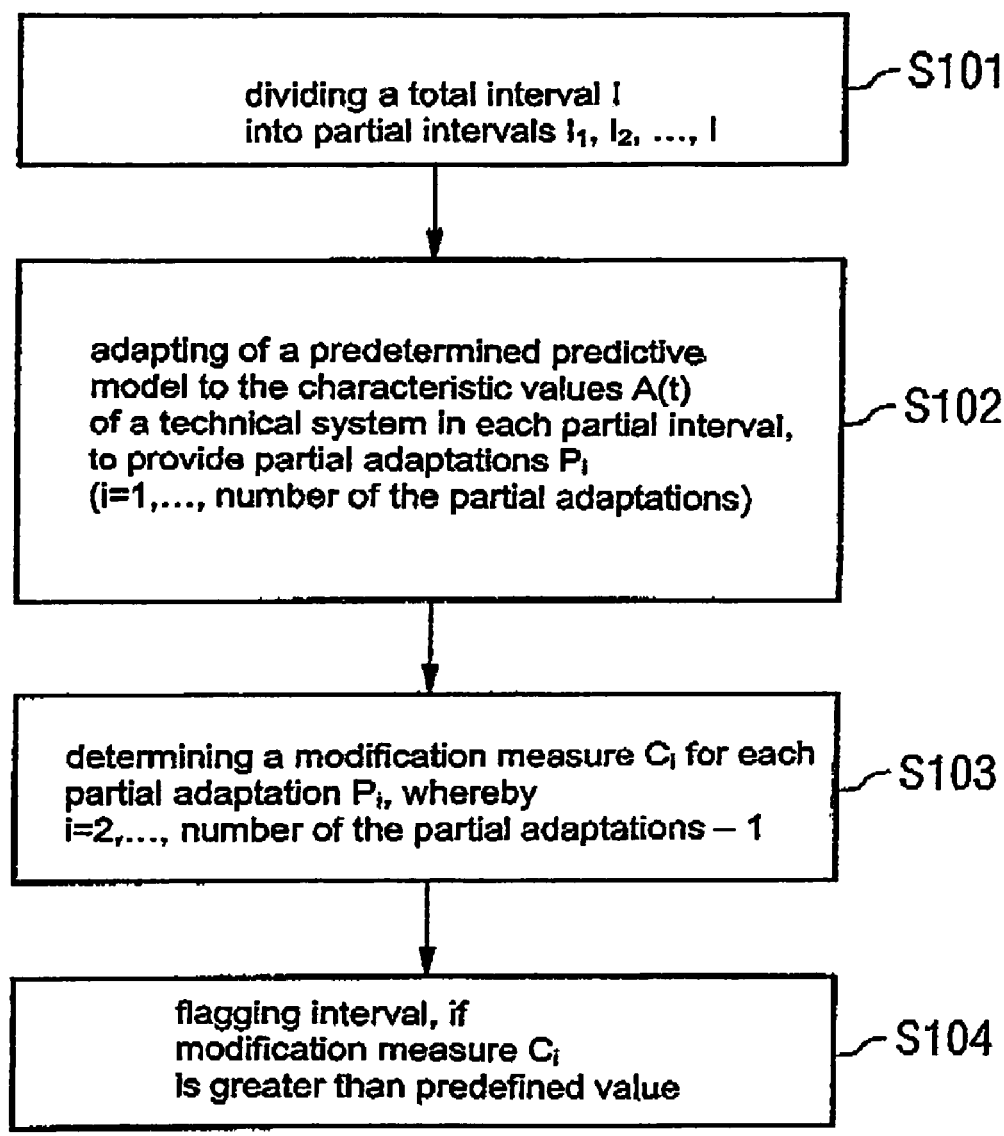
FIG. 1 is a diagram which shows the sequence of the method according to one potential embodiment of the invention.

Reference will now be made in detail to the preferred embodiments, examples of which are illustrated in the accompanying drawings, wherein like reference numerals refer to like elements throughout.

FIG. 1 shows a diagram which depicts the sequence of the evaluation method. In a first step S101 a total interval I is divided into partial intervals $I_1, I_2, \ldots, I$. In particular, the total interval is a time interval in which the technical system was tested and corrected. A multiplicity of characteristic values of the technical system are determined in this total interval, the characteristic values in the embodiment described here being the total number of failures of the technical system at corresponding instants in the total interval. This total number of failures is designated as $A(t)$, where t is any given instant in the total interval.

In a next step S102, a predetermined predictive model is adapted to the number of failures $A(t)$ of the technical system in each partial interval, thereby obtaining partial adaptations $P_i$ (i=1, ..., number of partial adaptations). In particular, the predetermined predictive model is a reliability growth model which is used for software-intensive technical systems and allows modeling of the characteristic values of the system such that the development of the characteristic values can be predicted.

In a next step S103, a modification measure $C_i$ is determined for each partial adaptation $P_i$ which lies between two partial adaptations (i.e. i=2, ..., number of partial adaptations−1), said modification measure $C_i$ specifying the modification of the parameters of the respective partial adaptation with reference to the parameters of the adjacent partial adaptations. For example, the modification measure $C_i$ can be determined as follows:

It is assumed that the predetermined predictive model comprises the parameters a, b and c, wherein the parameters which are adapted in the respective time interval I are designated as $a_i$, $b_i$ and $c_i$. The relative parameter modification of the partial adaptation in relation to the preceding or subsequent partial adaptation is now specified. In this context, the parameter modification is the maximum of the relative parameter modification between the preceding or subsequent partial adaptation and can be mathematically written as follows for the parameters a, b and c respectively:

$$C_i^a = \max(|a_i - a_{i-1}|/a_i; |a_i - a_{i+1}|/a_i)$$

$$C_i^b = \max(|b_i - b_{i-1}|/b_i; |b_i - b_{i+1}|/b_i)$$

$$C_i^c = \max(|c_i - c_{i-1}|/c_i; |c_i - c_{i+1}|/c_i)$$

On the basis of the parameter modifications $C_i^a$, $C_i^b$ and $C_i^c$, it is now possible to calculate a total parameter modification $C_i$ as follows:

$$C_i = \sqrt{d_1(C_i^a)^2 + d_2(C_i^b)^2 + d_3(C_i^c)^2}$$

The values $d_1$, $d_2$ and $d_3$ are positive numbers which represent weightings that are dependent on the selected predictive model.

Once the modification measures have been determined thus, in step S104 the time interval between the partial interval end points of the preceding partial adaptation $P_{i-1}$ and the subsequent partial adaptation $P_{i+1}$ is flagged as inhomogeneous for each partial adaptation $P_i$ if the respective modification measure $C_i$ is greater than a threshold value. The flagged intervals represent time intervals in which inhomogeneities in the test process might be present, e.g. because the test criteria were modified when the test phase was carried out or because the test personnel were replaced by other test personnel. In this way, inhomogeneities in the test phase of a technical system can be localized and then evaluated more closely.

Figure 2:
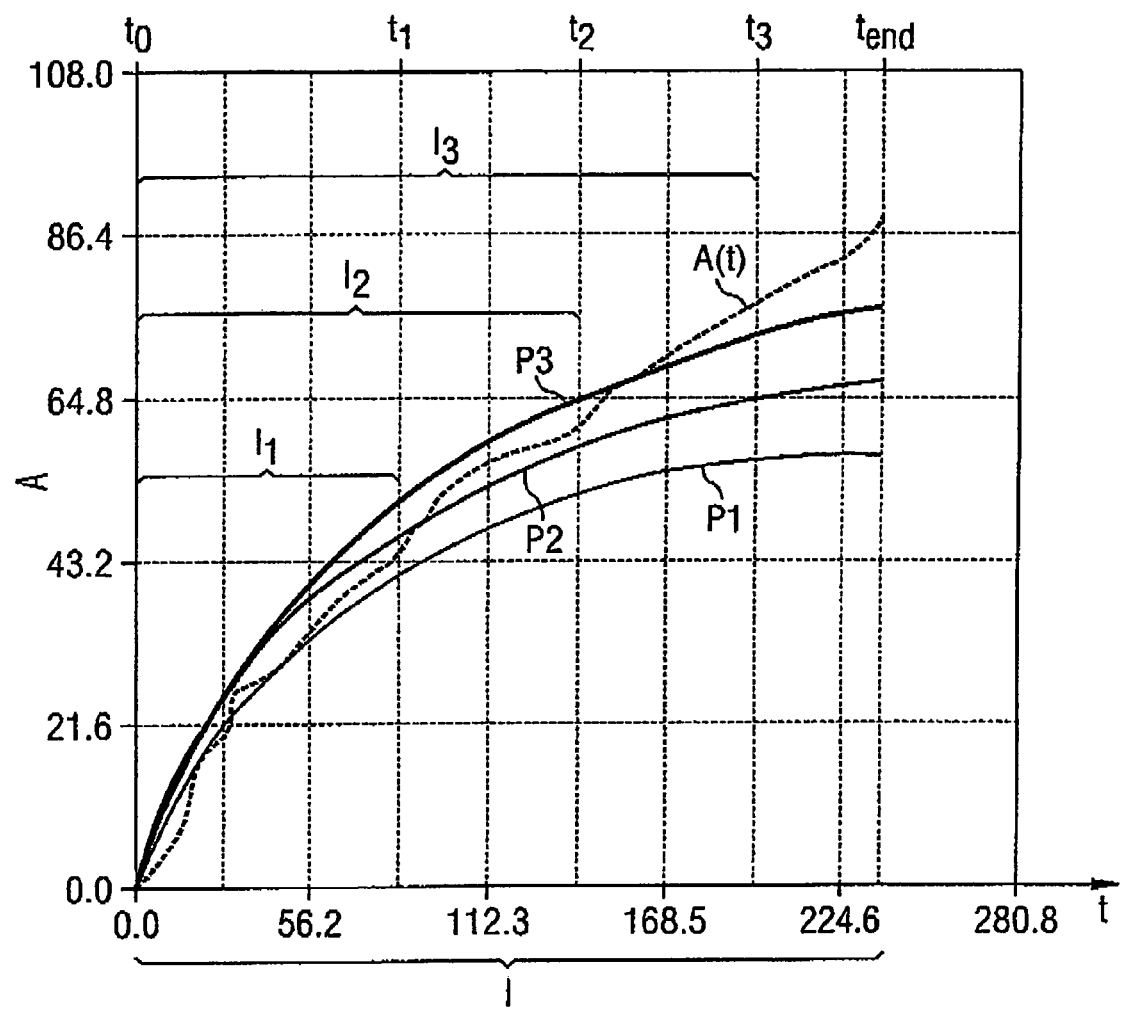
FIG. 2 is a diagram for illustrating the adaptation, which is carried out in the method according to one potential embodiment of the invention, of a predetermined predictive model to the characteristic values of a technical system.

FIG. 2 shows a diagram which illustrates the adaptation of the parameters of a predetermined predictive model to the characteristic values of a technical system, said adaptation being carried out in the method. The abscissa of the diagram is the time axis t and the ordinate represents the number of total failures A. The total failures $A(t)$ of the technical system, these being measured at predetermined instants in a total interval I between $t_0$ and $t_{end}$, are represented in the diagram in the form of measuring points. Different partial intervals are taken into consideration for the adaptation, wherein the partial intervals $I_1$, $I_2$ and $I_3$ are shown in FIG. 2. All partial intervals begin at the instant to =0 and become larger in turn. Interval $I_1$ extends from 0 to $t_1$, interval $I_2$ from 0 to $t_2$, and interval $I_3$ from 0 to $t_3$. The numbers of failures $A(t)$ in the individual time intervals are used for adapting the parameters of the predictive model concerned. Consequently, three curves $P_1$, $P_2$ and $P_3$ are produced for each interval $I_1$, $I_2$ and $I_3$, representing a corresponding prediction of the number of failures on the basis of the measured numbers of failures in the corresponding intervals. As is to be expected, the deviation of the number of failures determined using the prediction $P_3$ from the actual number of failures $A(t_{end})$ at the end point $t_{end}$ is smallest in this case.

Figure 3:
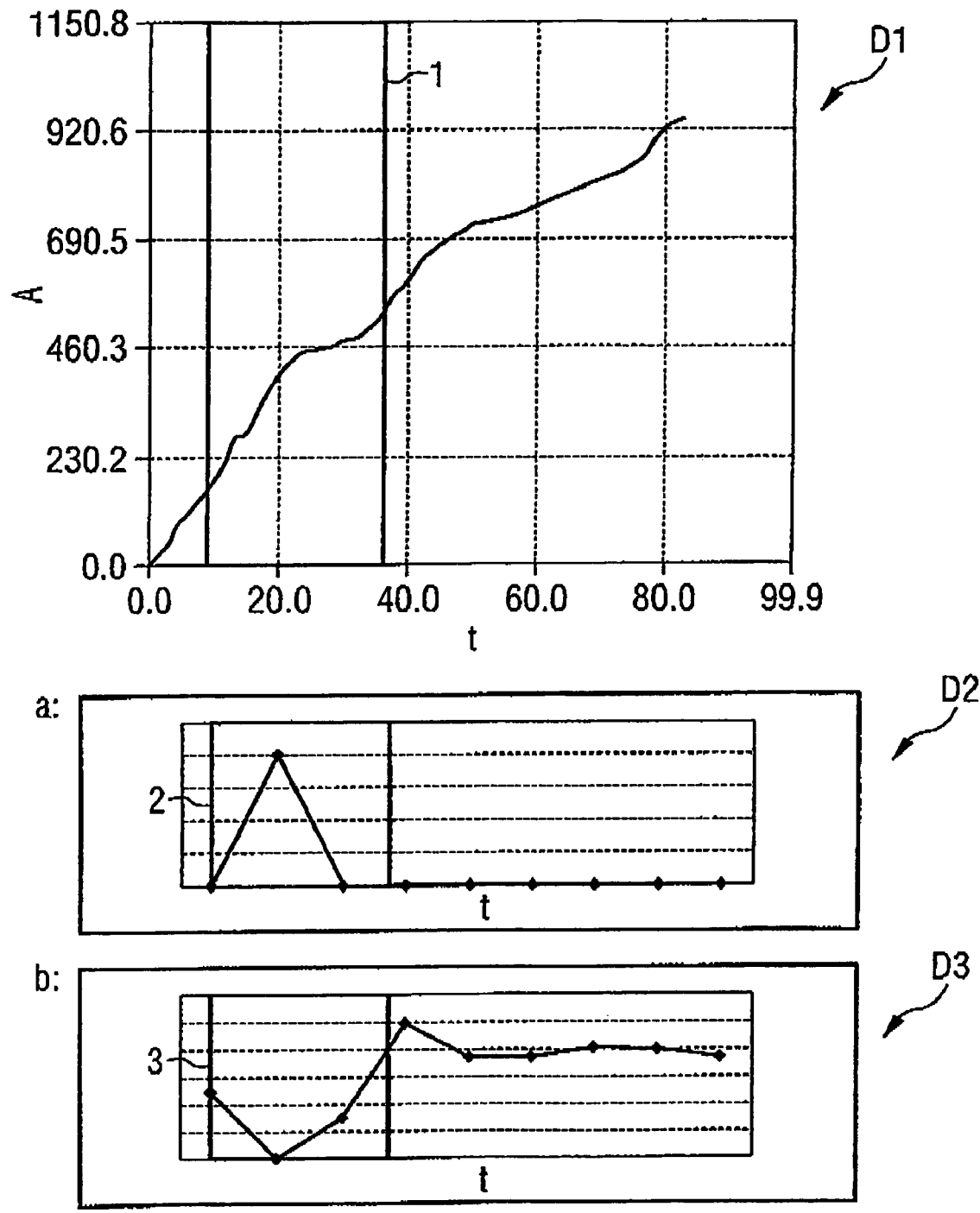
FIG. 3 is a diagram which graphically illustrates the modification of the parameters of the partial adaptations of a predetermined predictive model.

FIG. 3 shows a diagram which shows the modification of two parameters a, b of a reliability growth model in the case of adaptation to partial intervals. Diagram D1 shows the determined numbers of failures of a technical system, wherein the time t is plotted on the abscissa and the number of failures A is plotted on the ordinate. Partial adaptations of a reliability growth model of Goel & Okumoto were made to the characteristic values shown in D1. Diagram D2 shows the relative modification of the parameter a for different partial adaptations, wherein the partial interval end points of the individual partial adaptations are plotted on the abscissa. Diagram D3 shows a diagram which is similar to D2, except that the relative modification of the parameter b is depicted in D3. In all three diagrams, rectangles 1, 2 and 3 characterize time segments in which significant parameter fluctuations of the partial adaptations occur. The described rectangles serve merely to indicate the inhomogeneous areas, and do not correspond exactly to the intervals which are flagged as inhomogeneous by the method. It is evident from the diagrams D2 and D3 that significant fluctuations of the parameters a and b occur in the rectangles 2 and 3. It is therefore possible that inhomogeneities in the test process are present in this area, said inhomogeneities resulting in such a parameter fluctuation. Such inhomogeneities can be flagged by the method and subsequently examined in greater detail.

Figure 4:
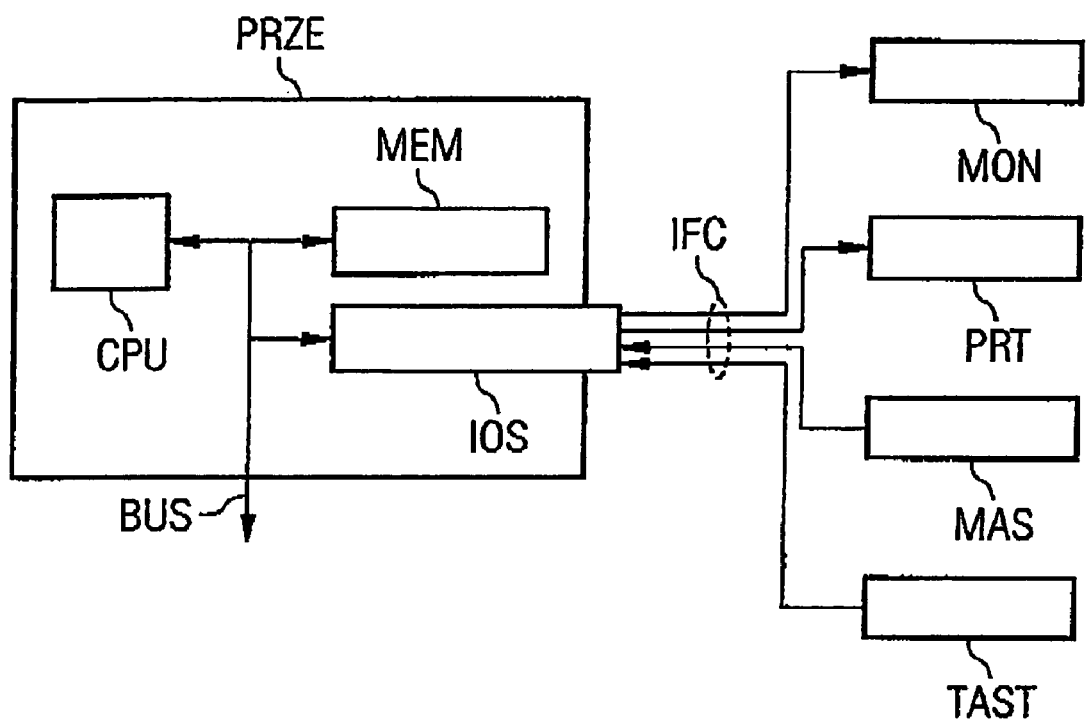
FIG. 4 shows a technical arrangement for performing the method according to one potential embodiment of the invention.

FIG. 4 shows a technical arrangement comprising a processor PRZE on which a program can be executed. The processor PRZE comprises a processor CPU, a memory MEM and an input/output interface IOS which is used in different ways via an interface IFC. An output is displayed on a monitor MON and/or output to a printer PRT via a graphical interface. An input is performed via a mouse MAS or a keyboard TAST. The processor PRZE also has a data bus BUS which provides the connection to the memory MEM, the processor CPU and the input/output interface IOS. Additional components can also be connected to the data bus BUS, e.g. additional memories, data storage in the form of a hard disk, or a scanner. The technical arrangement can be used as a device for evaluating the characteristic values of a technical system. Furthermore, the computer program product can be loaded into the memory MEM in order to perform the method. It is also conceivable that the technical arrangement in FIG. 4 represents the technical system whose characteristic values are evaluated by the method.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for computer-assisted evaluation of characteristic values of a technical system, comprising:
   dividing a total temporal interval into a plurality of partial intervals, the total temporal interval having a start point and an end point between which a plurality of characteristic values of the technical system are determined, each partial interval occurring between a partial interval start point and a partial interval end point within the total temporal interval, each partial interval having at least one characteristic value determined therein;
   adapting, for each partial interval, one or more parameters of a predetermined predictive model, the parameters being adapted to the at least one characteristic value determined in the partial interval, the parameters being adapted to provide partial adaptations, each partial adaptation having a corresponding partial interval and a corresponding partial interval end point;
   allocating the adjacent partial intervals with respective adjacent partial adaptations, the partial interval end point of each partial interval being adjacent to the partial interval end point of the respective partial adaptation;
   determining a modification measure for each of the partial adaptations specifying the modification of the parameters of a respective partial adaptation with reference to the parameters of at least one adjacent partial adaptation;
   determining if each modification measure is greater than a predefined value; and
   for each modification measure that is greater than the predefined value, flagging as an inhomogeneous interval the time interval between the partial interval end point of the respective partial adaptation and the partial interval end point of the adjacent partial adaptation.

2. The method as claimed in claim 1, wherein
   at least a portion of the partial intervals have first and second adjacent partial intervals, the first adjacent partial interval being associated with an earlier partial interval endpoint and the second adjacent partial interval being associated with a later partial interval endpoint,
   at least one of the modification measures is determined to modify the parameters to both the first and second adjacent partial intervals, and
   the inhomogeneous interval is defined as a time period from the earlier partial interval endpoint to the later partial interval endpoint.

3. The method as claimed in claim 1, wherein the modification measure specifies the amount the parameters of the relevant partial adaptation were modified to the parameters of the at least one adjacent partial adaptation.

4. The method as claimed in claim 1, wherein each partial interval begins at the start point of the total temporal interval.

5. The method as claimed in claim 1, wherein the one or more parameters of the predetermined predictive model are adapted to the at least one characteristic value using a maximum likelihood method and/or a least squares method.

6. The method as claimed in claim 1, wherein the predetermined predictive model is a reliability prediction model, and the characteristic values are values which represent reliability of the technical system.

7. The method as claimed in claim 6, wherein
   the characteristic values are each determined at a respective instant in time, and
   each characteristic value represents a number of total failures of the technical system at the instant the characteristic value was determined and/or
   each characteristic value represent an average time before the technical system will fail at the instant the characteristic value was determined.

8. The method as claimed in claim 1, wherein
   the technical system has a processor on which a computer program is executed, and
   the predetermined predictive model is a reliability growth model for the computer program.

9. The method as claimed in claim 1, wherein
   the total temporal interval is defined as the time period during which a test and correction phase of the technical system occurs, and
   during the test and correction phase, the technical system is continuously adapted to improve its reliability.

10. The method as claimed in claim 2, wherein the modification measure specifies the amount the parameters of the relevant partial adaptation were modified to the parameters of the at least one adjacent partial adaptation.

11. The method as claimed in claim 10, wherein each partial interval begins at the start point of the total temporal interval.

12. The method as claimed in claim 11, wherein the one or more parameters of the predetermined predictive model are adapted to the at least one characteristic value using a maximum likelihood method and/or a least squares method.

13. The method as claimed in claim 12, wherein
   the predetermined predictive model is a reliability prediction model, and
   the characteristic values are values which represent reliability of the technical system.

14. The method as claimed in claim 13, wherein
the characteristic values are each determined at a respective instant in time, and
each characteristic value represents a number of total failures of the technical system at the instant the characteristic value was determined and/or
each characteristic value represent an average time before the technical system will fail at the instant the characteristic value was determined.

15. The method as claimed in claim 14, wherein
the technical system has a processor on which a computer program is executed, and
the predetermined predictive model is a reliability growth model for the computer program.

16. The method as claimed in claim 15, wherein
the total temporal interval is defined as the time period during which a test and correction phase of the technical system occurs, and
during the test and correction phase, the technical system is continuously adapted to improve its reliability.

17. A computer readable medium having stored thereon a computer program which when executed by a computer causes the computer to perform a method for evaluating characteristic values of a technical system, the method comprising:
dividing a total temporal interval into a plurality of partial intervals, the total temporal interval having a start point and an end point between which a plurality of characteristic values of the technical system are determined, each partial interval occurring between a partial interval start point and a partial interval end point within the total temporal interval, each partial interval having at least one characteristic value determined therein;
adapting, for each partial interval, one or more parameters of a predetermined predictive model, the parameters being adapted to the at least one characteristic value determined in the partial interval, the parameters being adapted to provide partial adaptations, each partial adaptation having a corresponding partial interval and a corresponding partial interval end point;
allocating the adjacent partial intervals with respective adjacent partial adaptations, the partial interval end point of each partial interval being adjacent to the partial interval end point of the respective partial adaptation;
determining a modification measure for each of the partial adaptations specifying the modification of the parameters of a respective partial adaptation with reference to the parameters of at least one adjacent partial adaptation;
determining if each modification measure is greater than a predefined value; and
for each modification measure that is greater than the predefined value, flagging as an inhomogeneous interval the time interval between the partial interval end point of the respective partial adaptation and the partial interval end point of the adjacent partial adaptation.

18. A computer-assisted system for evaluating characteristic values of a technical system, comprising:
a division unit to divide a total temporal interval into a plurality of partial intervals, the total temporal interval having a start point and an end point between which a plurality of characteristic values of the technical system are determined, each partial interval occurring between a partial interval start point and a partial interval end point within the total temporal interval, each partial interval having at least one characteristic value determined therein;
an adaptation unit to adapt, for each partial interval, one or more parameters of a predetermined predictive model, the parameters being adapted to the at least one characteristic value determined in the partial interval, the parameters being adapted to provide partial adaptations, each partial adaptation having a corresponding partial interval and a corresponding partial interval end point;
an identification unit to allocate the adjacent partial intervals with respective adjacent partial adaptations, the partial interval end point of each partial interval being adjacent to the partial interval end point of the respective partial adaptation;
a first determination unit to determine a modification measure for each of the partial adaptations specifying the modification of the parameters of a respective partial adaptation with reference to the parameters of at least one adjacent partial adaptation;
a second determination unit to determine if each modification measure is greater than a predefined value; and
a flag unit, for each modification measure that is greater than the predefined value, to flag as an inhomogeneous interval the interval between the partial interval end point of the respective partial adaptation and the partial interval end point of the adjacent partial adaptation.

* * * * *